(12) United States Patent
Green et al.

(10) Patent No.: US 8,175,614 B1
(45) Date of Patent: May 8, 2012

(54) METHOD AND SYSTEM FOR ASSOCIATING A LOCATION WITH A WIRELESS MODEM

(75) Inventors: Douglas R. Green, Lenexa, KS (US);
Stevan A. Klesper, Gardner, KS (US);
Manoj Monga, Olathe, KS (US); Lei Zhu, Overland Park, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 696 days.

(21) Appl. No.: 12/247,285

(22) Filed: Oct. 8, 2008

(51) Int. Cl.
*H04W 4/00* (2009.01)
*H04M 1/00* (2006.01)
*H04M 3/42* (2006.01)
*H04B 7/00* (2006.01)
*H04J 1/02* (2006.01)

(52) U.S. Cl. ............. 455/456.1; 455/433; 455/521; 455/414.1; 370/338; 370/493

(58) Field of Classification Search .......... 455/433, 455/456.1, 521, 414.1; 370/338, 493
See application file for complete search history.

(56) References Cited

U.S. PATENT DOCUMENTS

| 2003/0119501 A1* | 6/2003 | Kim | 455/433 |
| 2005/0213604 A1* | 9/2005 | Howe | 370/463 |
| 2006/0268902 A1* | 11/2006 | Bonner | 370/401 |

OTHER PUBLICATIONS

Federal Communications Commission, "FCC's Wireless Phase 1 and Phase 2 Guidelines," Telecommunicator's Wireless Ali Handbook, 6 pages, http://locatemodelcities.org/library/wrlsALlhandbook.pdf.
U.S. Coast Guard, "Global Incident Notification (GIN) Secondary Public Safety Answering Point (PSAP) Test and Evaluation," Final Report, Apr. 2005, 89 pages, Report No. CG-D-06-05, U.S. Coast Guard Research and Development Center, Groton, Connecticut.

* cited by examiner

*Primary Examiner* — Ariel Balaoing (57) ABSTRACT

There is disclosed herein a method, system and computer software product for associating a location with a wireless modem, wherein the modem has a modem identifier and a registered address associated therewith and wherein the method comprises: receiving a communication transmitted by the modem wherein the communication includes the modem identifier; determining whether the base station first receiving the communication is located within a predetermined proximity of the registered address; associating with the communication a receiving base station identifier of the base station that first received the communication; associating with the registered address a registered address base station identifier associated therewith; and comparing the registered address base station identifier with the receiving base station identifier.

24 Claims, 9 Drawing Sheets

METHOD AND SYSTEM FOR ASSOCIATING A LOCATION WITH A WIRELESS MODEM

TECHNICAL BACKGROUND

As telephony technologies have developed over the years, many and varied services have developed in association therewith. Caller identification and location determination are two such services that have found use in both wired and wireless telephone technologies in filling both pubic and private sector needs.

In the public sector, for example, the late 1960s saw the beginnings of an implementation of an emergency response system (ERS). The ERS automatically associated a call to a public safety answering point (PSAP) (such as a police station, sheriff's office, state patrol, or regional public safety office) the location of the telephone originating the call through telephone company records. In this way, the location of an emergency could typically be precisely located, thereby facilitating faster responses by emergency personnel, in many if not the large majority of instances. In the United States, this system is implemented by dialing 9-1-1 though other number combinations are in use elsewhere around the world. For example, member states of the European Union use 1-1-2.

At the time of the implementation of the emergency response system, only a very small percentage of telephones were not hard wired into the telephone system. That is, there were very few wireless telephones in use. The increasing proliferation of mobile wireless communication devices has complicated this early conception of the 911 system, however. Since such devices are not anchored to a single location, calls placed with early versions of those devices had no definite location associated with the incoming calls. These emergency calls would be routed to some emergency response agency, such as a state highway patrol agency in the United States, who would ask the caller for location information so that the appropriate emergency response personnel could be dispatched to the location. Such an operational emergency response methodology relied upon the caller being able to provide accurate location information. Where the caller was a child, an injured party, or someone who was lost, for example, determining the location to which emergency personnel should be directed was often problematic.

Over time, and particularly as many individuals fled from wired telephone connections to wireless technologies for residential telephone services, a need was seen for providing automatic location information of a wireless device originating an emergency call to a PSAP. Currently, there are many technologies and methodologies available to determine the location of a wireless device with varying degrees of accuracy. The most accurate of these utilizes the global positioning system (GPS), which uses signals from satellites to determine the location of the wireless device to within a few meters.

Newer technologies have once again complicated the ERS system, though. Portable, but not mobile, wireless modems are becoming available for accessing the Internet. These modems are intended to solve what has become known in the United States as the "last mile" problem—a lack of high speed connections to the Internet over short distances, principally from residences and businesses, in lieu of proprietary fixed wire technologies such as digital subscriber lines (commonly known as DSL) or cable.

This new wireless modem technology is being developed by several industry leaders and goes by various names, including Wi-MAX (Worldwide Interoperability for Microwave Access), which is being developed pursuant to the IEEE 802.16 standard, and 3GPP LTE (3d Generation Partnership Project Long Term Evolution), both of which are ultimately expected to be known as 4G or fourth generation wireless communications technologies.

Wireless modems, whether of the Wi-MAX or 3GPP LTE variety will typically include wireless routers to establish local area networks and to enable other computers to access the Internet also. These modems also often include telephone jacks capable of accepting connections from standard telephones. In such cases, voice communications are sent as data packets using Voice over Internet Protocol, commonly referred to as VoIP. In addition, the modems may include wireless connections to other mobile devices, such as telephones or computers, as well as wired connections to such devices or other household and business appliances.

One of the consequences of the use of such modems is that 9-1-1 emergency telephone calls are now being place through these modems using either wired or wireless telephones in communication therewith. While GPS could be of use to determine the location of the modems, the modems are often placed indoors to facilitate communications between the modem and other wireless devices connecting to the Internet through the modem. Regardless of the precise location of the modem within a building, reception of GPS signals can be troublesome and, more often than not, is insufficient to be used in location determinations. Thus, to enable emergency responders to be able to find emergency locations, users of this type of equipment are required to register an address where the modem is to be used. When an emergency call is received, then, the registered address of the modem can be associated with the call and emergency response personnel appropriately dispatched.

Difficulties arise with the foregoing procedure, however, since the portable nature of the modems means they may be moved from the registered address. Users are supposed to update the registered address if the modem is moved, but this does not always happen, particularly if the move is temporary, such as taking the modem along for a vacation. In such a circumstance emergency responders may be sent to the registered address when the call is in fact originating tens, hundreds, or even thousands of miles away from the registered address. Another methodology must be used in such circumstances to determine the location of the modem so the appropriate service providers can be sent to the proper location.

As noted above, the private sector has also made widespread and varied use of telephone service such as caller identification and location determination, Many organizations, particularly delivery services such as pizza delivery businesses, have come to rely upon being able to immediately associate a location with an incoming telephone call. Thus, while there is an obvious concern in being able to provide services in life-threatening situations, the private sector has also been impacted by the use of these wireless modems. The use of these wireless modems could result in deliveries to the registered address rather than the address from where a call was actually placed, leading to unhappy customers and wasted business resources.

Overview

There is disclosed herein a method for operating a communication system wherein the method comprises receiving a communication transmitted by a wireless modem, wherein the modem has a modem identifier and a registered address associated therewith and wherein the communication includes the modem identifier; associating with the communication a receiving base station identifier of the base station that first received the communication, and determining whether the base station first receiving the communication is located within a predetermined proximity of the registered address.

There is also disclosed herein a communications system for associating a location with a wireless modem, wherein the modem has a modem identifier and a registered address associated therewith, and wherein the system comprises a processing system including a storage system, software for directing operation of the processing system, a communications interface, and a user interface, the processing system configured to receive a communication transmitted by the modem, wherein the communication includes the modem identifier, and to determine whether the base station first receiving the communication is located within a predetermined proximity of the registered address.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
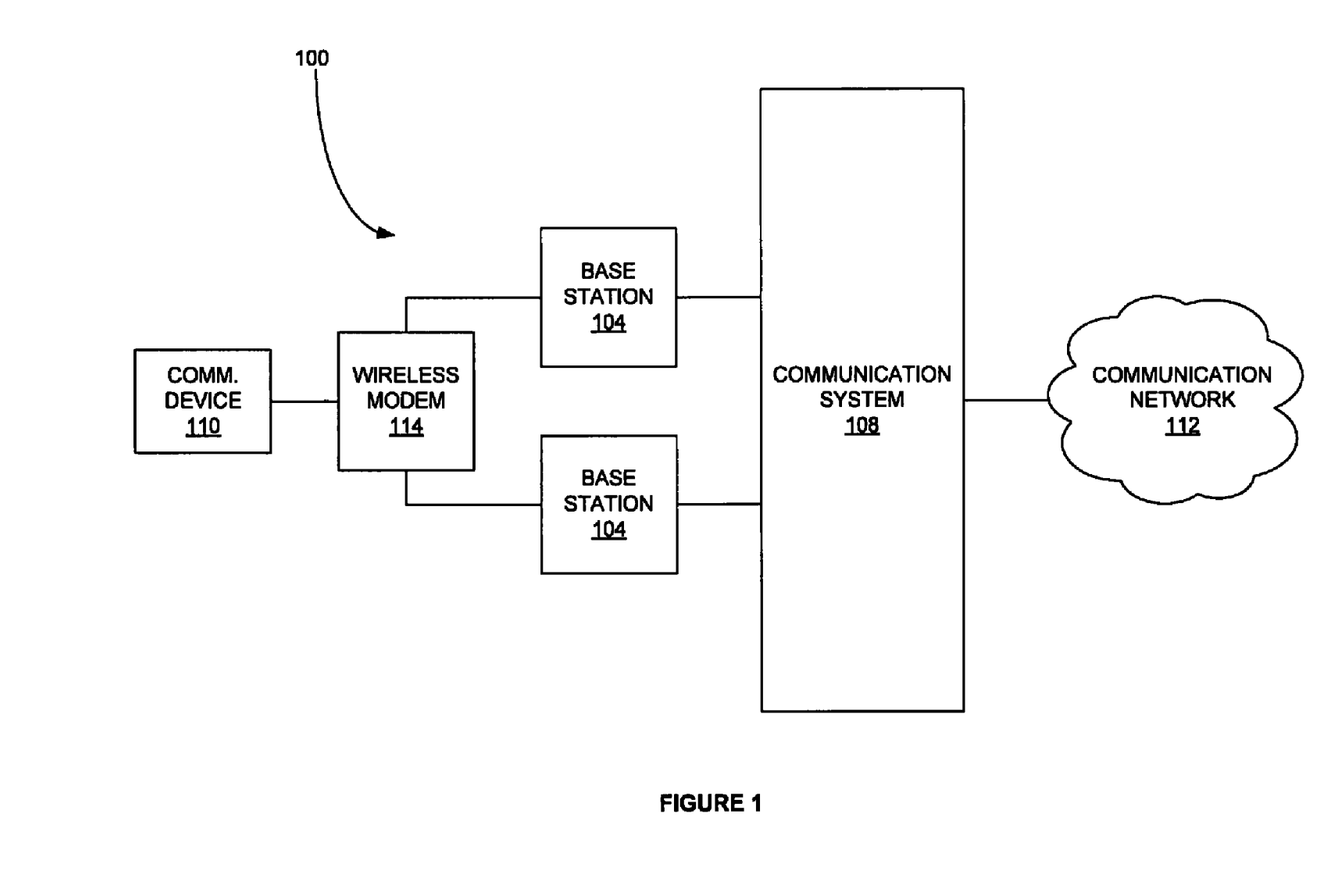
FIG. 1 is a block diagram illustrating a communications environment in which the embodiments disclosed herein may be used.

FIG. 1 illustrates a block diagram of communication environment 100 in which the various exemplary embodiments and their equivalents of the present invention can be employed. As shown in FIG. 1, such an environment 100 includes communication device 110, wireless modem 114, base transceiver stations 104, communication system 108, and communication network 112. Communication system 108 is in communication with communication network 112. Each base transceiver station 104 communicates with communication system 108. Wireless modem 114 connects wirelessly to base transceiver station 104. Communication device 110 is in communication with wireless modem 114.

Communication device 110 is capable of transmitting and receiving voice data. Communication device 110 comprises hardware and circuitry programmed to function as a telecommunications device. For example, communication device 110 comprises a telephone, a wireless telephone, a short-range cordless telephone, an Internet appliance, a personal digital assistant, a computer, a terminal adapter, or any other telecommunications device. Communication device 110 may be distributed among multiple devices that together comprise element 110.

It will also be understood that communication device 110 is representative of other residential and business appliances such as furnaces, refrigerators, dishwashers, and kitchen ranges. Such appliances may be equipped with their own wireless technology well known in the art to communicate with wireless modem 114, and, for example, would be able to automatically connect to a repair service when malfunctioning.

Communication device 110 is connected to wireless modem 114. The link between communication device 110 and wireless modem 114 may be either a wired or wireless connection.

Wireless modem 114 comprises hardware and circuitry capable of providing wireless broadband access for communication device 110. For example, wireless modem 114 comprises a portable wireless modem of the type requiring a registered address as heretofore described, a Worldwide Interoperability for Microwave Access (WiMAX) modem, an Evolution-Data Optimized (EVDO) modem, a Fourth-Generation (4G) modem, a cellular modem, or any device that wirelessly provides a gateway function between a communication network and a communication device. Wireless modem 114 may be distributed among multiple devices that together comprise element 114. Moreover, wireless modem 114 may comprise a single device in which both a wireless modem and a communication device, such as communication device 110, are embedded within.

Wireless modem 114 could transmit and receive utilizing any number of wireless technologies including, but not limited to, Code Division Multiple Access (CDMA) 1xRTT, Global System for Mobile communications (GSM), High-Speed Packet Access (HSPA), EVDO, EVDO rev. A, WiMAX, and the like. Further, wireless modem 114 may include the ability to transmit and receive over a single wireless protocol or multiple wireless protocols and may have the ability to simultaneously utilize multiple protocols.

It will be understood that an environment such as communication environment 100 may include many more modems than the single wireless modem 114 shown in FIG. 1 and that more than a single communication device 110 may be in communication with one or more wireless modem 114. For the purposes of clarity only, only one of each such item has been shown herein.

Wireless modem 114 is in communication with one or more base transceiver stations 104 via a wireless connection. Base transceiver station 104 comprises hardware, circuitry, transceivers and other equipment capable of transmitting and receiving radio signals to provide wireless communication between wireless modem 114 and communication network 112.

Base transceiver station 104 is in communication with communication system 108. The connection between base transceiver station 104 and communication system 108 may be either a wired or wireless connection.

Communication system 108 is connected to communication network 112. The link between communication system 108 and communication network 112 may be either a wired or wireless connection. Communication system 108 facilitates communication between base station 104 and communication network 112. For example, communication system 108 comprises an Access Service Network (ASN), an ASN Gateway, a Media Gateway, a Media Gateway Controller (MGC), a softswitch, a Base Station Controller (BSC), a Mobile Switching Center (MSC), a transcoder, a Transcoder and Rate Adaptation Unit (TRAU), a Packet Control Unit (PCU), or any other system or equipment participating in the communication between base station 104 and communication network 112.

Communication network 112 is capable of providing a communication service to wireless modem 114 and communication device 110. For example, communication network 112 could comprise a packet-switched network, such as the Internet, a Session Initiation Protocol (SIP) network, a public switched telephone network (PSTN), a Radio Access Network (RAN), an asynchronous transfer mode (ATM) network, a personal communication service (PCS) network, a local area network (LAN), a wide area network (WAN), a Voice over Internet Protocol (VoIP) network, or any other network that provides a communication service to communication device 110 or communication system 108. Moreover, communication network 112 could comprise any of the public switched data networks (PSDNs) such as an Internet Protocol network (Internet), Frame Relay, General Packet Radio Service (GPRS), Ethernet, and others.

It will be understood, of course, that the foregoing communication environment 100 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner and location.

Figure 2:
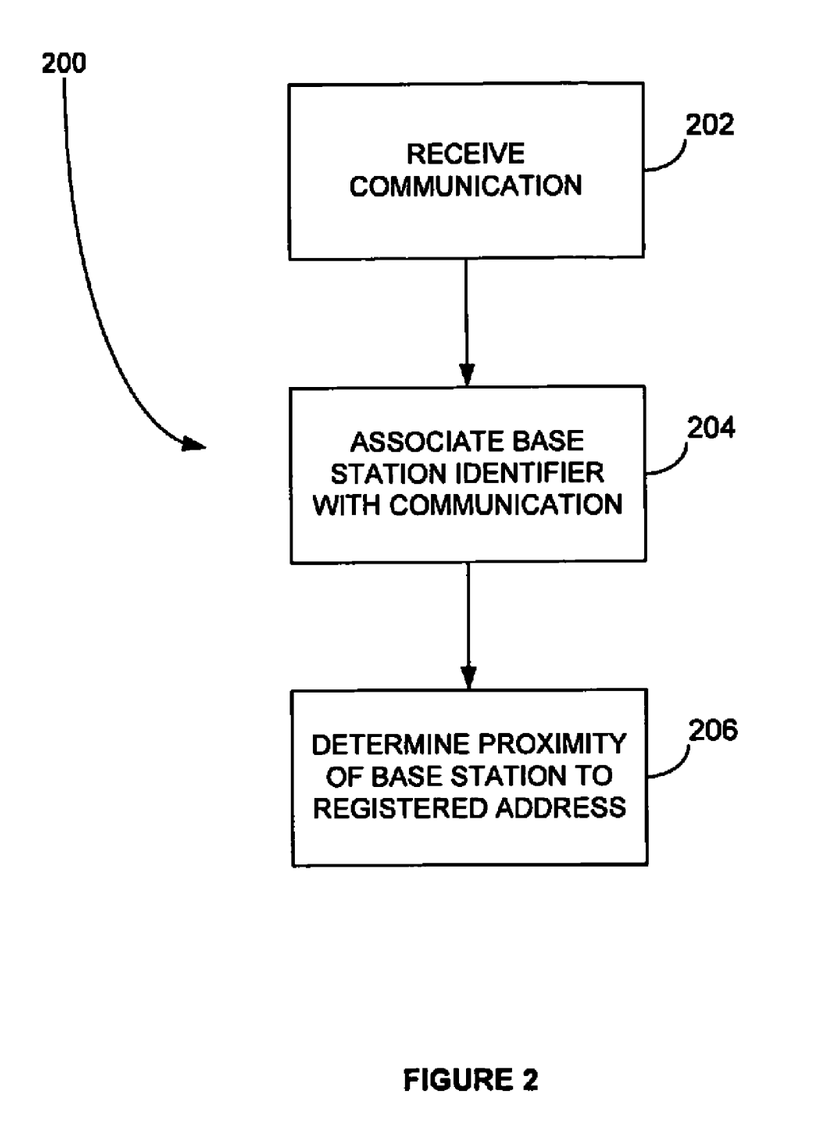
FIG. 2 is a flow diagram illustrating an embodiment of a method for associating an address with the location of a portable, wireless modem.

FIG. 2 illustrates an exemplary embodiment of a method 200 for associating a location with a wireless modem is illustrated. As used herein, "exemplary" should be understood as meaning "typical," "representative," "serving as an example," or "illustrative." The description of any particular embodiment disclosed herein as "exemplary" is not necessarily to be construed as preferred or advantageous over other embodiments.

Method 200 includes receiving a communication sent from a wireless modem having a registered address at step 202. Such communications will typically include an identifier unique to the modem to allow the particular device transmitting the communication to be identified. At step 204, the base station identifier of the first station to receive the communication is associated with the communication. Subsequently, at step 206 a determination is made as to whether the base station first receiving the communication is at a location within a predetermined proximity of the registered address.

Figure 3:
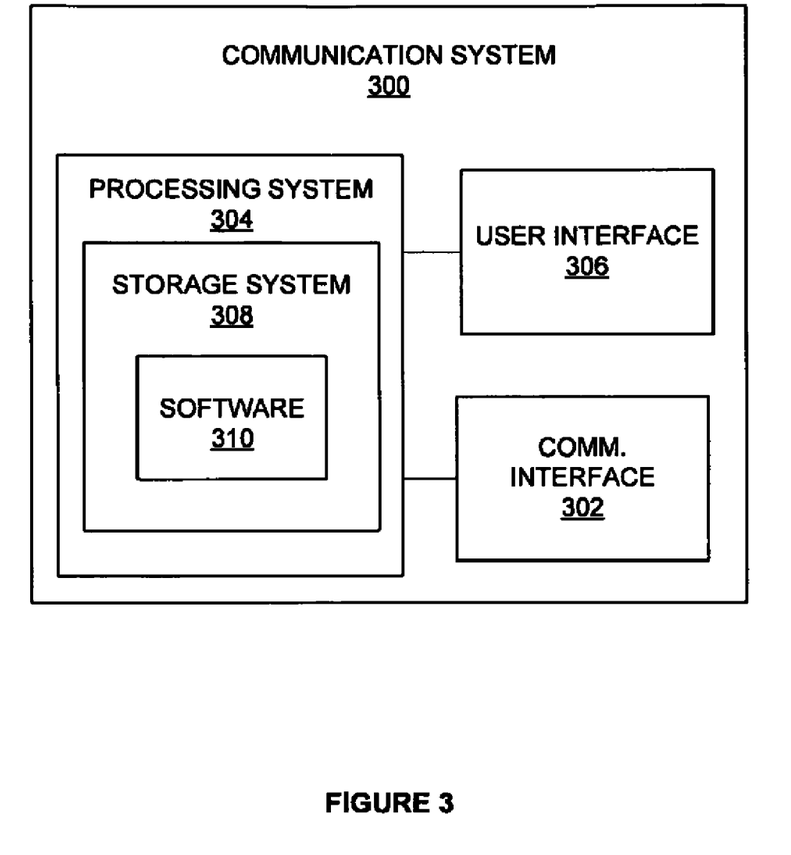
FIG. 3 is a block diagram illustrating a communications system in an embodiment.

FIG. 3 illustrates communication system 300 in which the embodiments disclosed herein may find application. System 300 includes communication interface 302, processing system 304, and user interface 306. Processing system 304 includes storage system 308. Storage system 308 stores software 310. Processing system 304 is linked to communication interface 302 and user interface 306. Communication system 300 could be comprised of a programmed general-purpose computer, although those skilled in the art will appreciate that programmable or special purpose circuitry and equipment may be used. Communication system 300 may be distributed among multiple devices that together comprise elements 302-310.

Communication interface 302 could comprise a network interface, modem, port, transceiver, or some other communication device. Communication interface 302 may be distributed among multiple communication devices. Processing system 304 could comprise a computer microprocessor, logic circuit, or some other processing device. Processing system 304 may be distributed among multiple processing devices. User interface 306 could comprise a keyboard, mouse, voice recognition interface, microphone and speakers, graphical display, touch screen, or some other type of user device. User interface 306 may be distributed among multiple user devices. Storage system 308 could comprise a disk, tape, integrated circuit, server, or some other memory device. Storage system 308 may be distributed among multiple memory devices.

Processing system 304 retrieves and executes software 310 from storage system 308. Software 310 may comprise an operating system, utilities, drivers, networking software, and other software typically loaded onto a computer system. Software 310 could comprise an application program, firmware, or some other form of machine-readable processing instructions. When executed by processing system 304, software 310 directs processing system 304 to operate as described herein.

Communication system 300 may be implemented as part of a communication system 108 as shown in FIG. 1. Such a communication system may include any specialized 9-1-1 equipment or any other equipment useful in using the embodiments shown herein.

Figure 4:
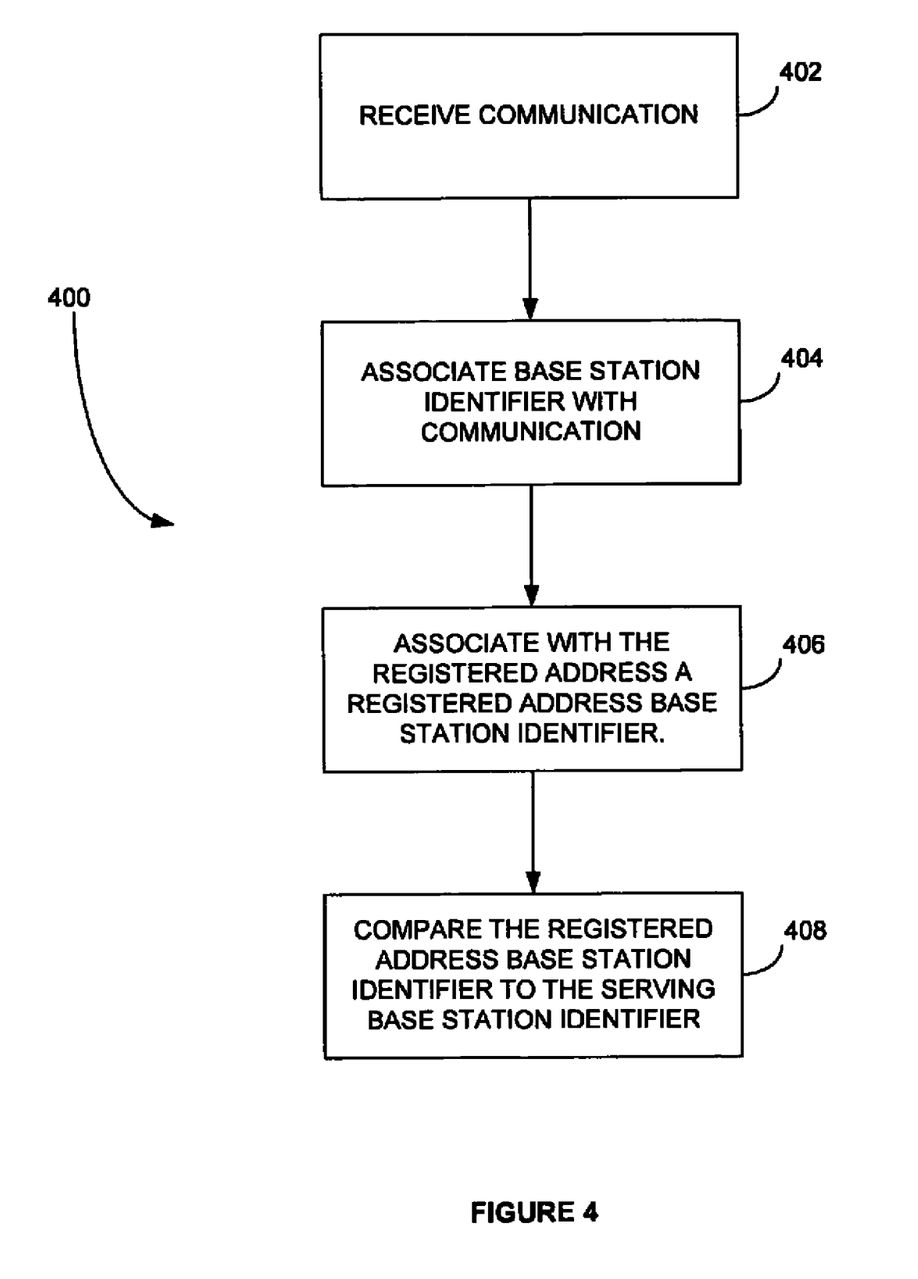
FIG. 4 is a flow diagram illustrating another embodiment of a method for associating an address with the location of a portable, wireless modem.

FIG. 4 illustrates another embodiment 400 of a method for associating a location with a wireless modem. Embodiment 400 comprises receiving a communication at step 402 having an associated modem identifier and registered address. At step 404 the base station serving the modem is associated with the communication. The proximity of the base station to the registered address is determined at steps 406 and 408. First, at step 406 the registered address is associated with a base station identifier of the base station that should normally receive communications from the modem if the modem is located at the registered address. Then at step 408 a comparison is made of the registered address base station identifier with the base station identifier of the base station first receiving the communication. If the comparison at step 408 indicates the registered address base station identifier and the serving base station identifier are the same, then it can be presumed that the modem is most likely located at the registered address. If the identifiers are different, however, then further steps are necessary to locate the modem.

Figure 5:
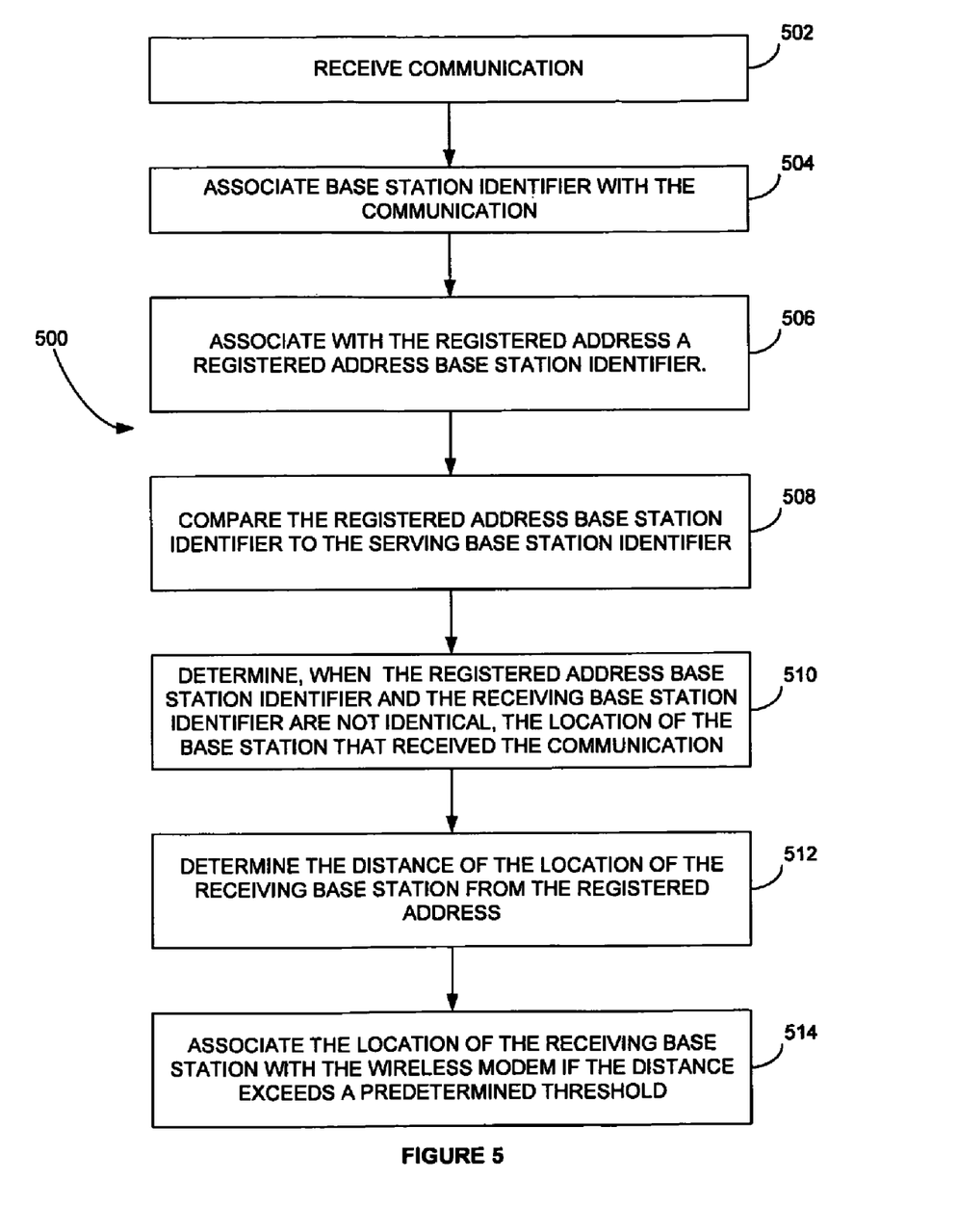
FIG. 5 is a flow diagram illustrating still another embodiment of a method for associating an address with the location of a portable, wireless modem.

Referring to FIG. 5, another embodiment 500 of a method for associating a location with a wireless modem is illustrated. Steps 502-508 are similar to those of steps 402-408 of FIG. 4, respectively. Embodiment 500 comprises receiving a communication at step 502 having an associated modem identifier and registered address. At step 504 the base station serving the modem is associated with the communication. Subsequently, the proximity of the base station to the registered address is determined. At steps 506 and 508, this determination is made by associating with the registered address a base station identifier of the base station that should normally receive communications from the modem if the modem is located at the registered address. Then a comparison is made at step 508 to determine if the registered address base station identifier and the serving base station identifier are the same.

If the comparison at step 508 indicates the registered address base station identifier and the serving base station identifier are the same, then it can be presumed that the modem is most likely located at the registered address. If the identifiers differ, however, then embodiment 500 provides for determining the location of the serving or receiving base station at step 510. The distance of the location of the receiving base station from the registered address can then be determined using any number of well-known techniques in the art at step 512.

For example, one method of determining the distance of the receiving base station from the registered address is to first determine the registered address and the latitude and longitude of the base station. Then, to determine if the modem has moved from its registered location, the registered address is subtracted from the location of the receiving base station.

If the distance determined in step 512 exceeds a predetermined threshold, then the location of the serving base station will be associated with the wireless modem. In such a circumstance, a PSAP serving the receiving base station will have the call routed to it for the appropriate response.

Method 500 provides an appropriate response to situations that may arise where the communication is not received by the base station associated with the registered address. Such situations can occur, for example, where a modem lies on a boundary between one or more base stations such that any one of them may receive the call depending upon existing conditions, such as communications traffic. If the receiving base station is within the predetermined threshold distance from the registered address, a presumption may be followed that the modem is still located at the registered address and the PSAP for that registered address will receive the call. If the distance determined at step 512 is not within that predetermined threshold, then a presumption may be followed that the modem is not at the registered address and at least as an initial step the location of the receiving base station will be associated with the call. In this way, if the modem has been moved a far distance away from the registered address, a PSAP relatively close to the modem will receive the routed call rather than the PSAP associated with the registered address.

Alternatively, it may be desirable to associate multiple base stations within a predefined proximity to the registered address. In such a case, the embodiments discussed with regard to FIGS. 4 and 5 could provide for a comparison of the receiving base station identifier with any of the base station identifiers associated with the registered address. If there was a match with any of them, a presumption may be followed that the modem is located at the registered address and the communication could be routed to the public safety answering point for the registered address.

While the foregoing discussion has focused on routing emergency calls to the most appropriate public safety answering point, it will be understood that the methods have application in the private sector as well. Thus, certain businesses, and in particular, delivery services, may wish to pay telecommunications service providers for services such as those described herein. By way of example only, a pizza delivery service needs to have the correct address in order to make a timely delivery. As telephone calls are received by such businesses now, often a home address is already associated with the call through public telephone records. VoIP calls may similarly carry an associated address therewith. If, however, the modem used to place the VoIP call has been relocated from the registered address, it will be necessary to determine where the modem is and to route the call to the most appropriate delivery service close to the actual location of the modem, all in accord with the disclosures set forth above and hereinafter.

In addition, as noted earlier, modern telecommunications systems make it possible for residential and business appliances to be outfitted with wireless communications devices that could communicate with a service center through a wireless modem such as modem 114 of FIG. 1. In this manner service centers could be alerted to potential malfunctions in those appliances and service performed automatically pursuant to an agreement or scheduled for a later date. To do so, however, requires knowing where the appliance is located. Since appliances as well modems can be moved from an original location, the methods previously and hereafter disclosed enable those locations to be determined.

Figure 6:
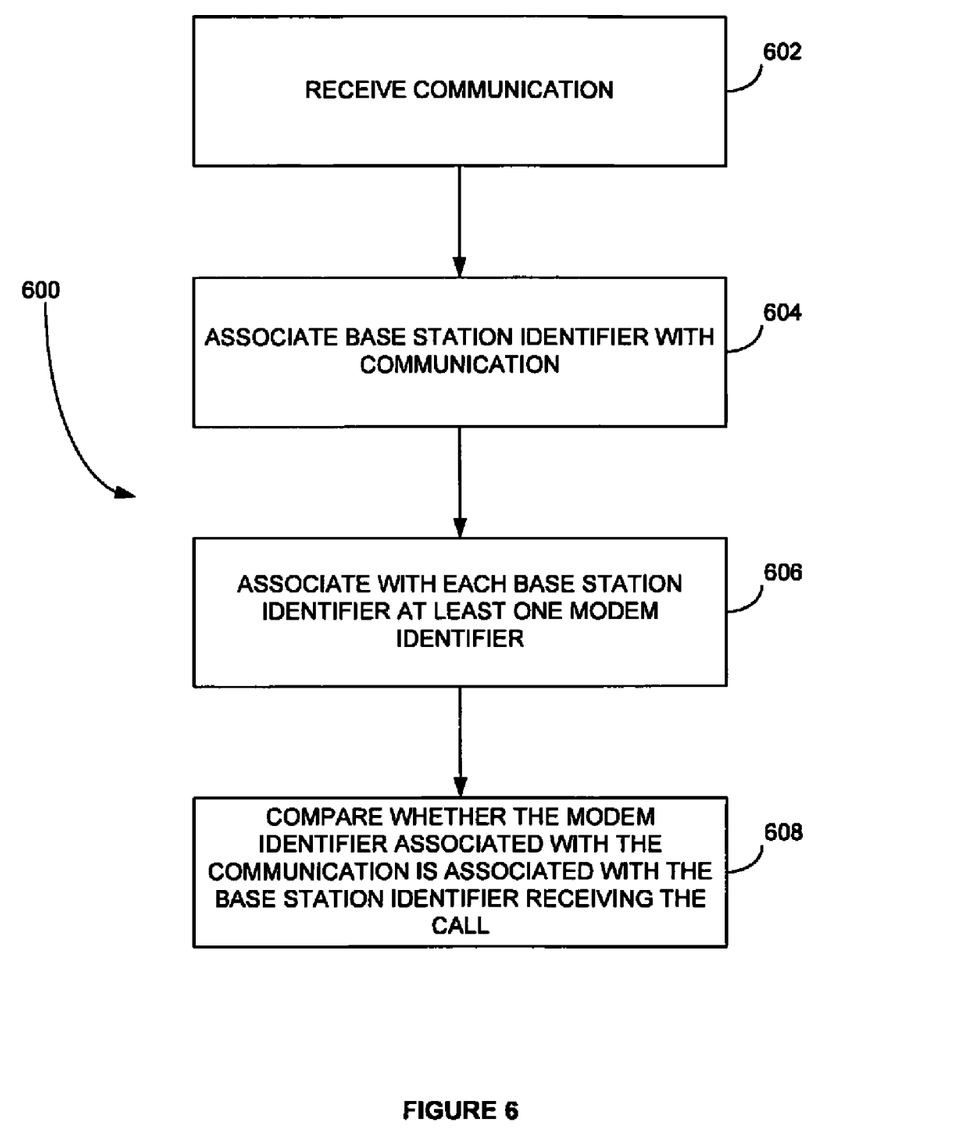
FIG. 6 is a flow diagram illustrating yet another embodiment of a method for associating an address with the location of a portable, wireless modem.

FIG. 6 illustrates another embodiment of a method for associating a location with a wireless modem. Embodiment 600 comprises receiving a communication at step 602 having an associated modem identifier and registered address. At step 604 the base station serving the modem is associated with the communication. Subsequently, the proximity of the base station to the registered address is determined. At steps 606 and 608, this determination is made by first associating with each base station identifier at least one modem identifier and then comparing whether the modem identifier associated with the communication is in turn associated with the base station identifier receiving the call. That is, unlike the previously discussed embodiment, in the method shown in FIG. 5 the relationship is drawn from base station identifier to the modem identifier rather than modem identifier to base station identifier. In practice, both methods should suffice and could be implemented jointly. Where an association exists, the call can be routed to the appropriate service provider, whether a PSAP or private sector business. Where such an association does not exist, then the method disclosed in FIG. 6 may be used.

Figure 7:
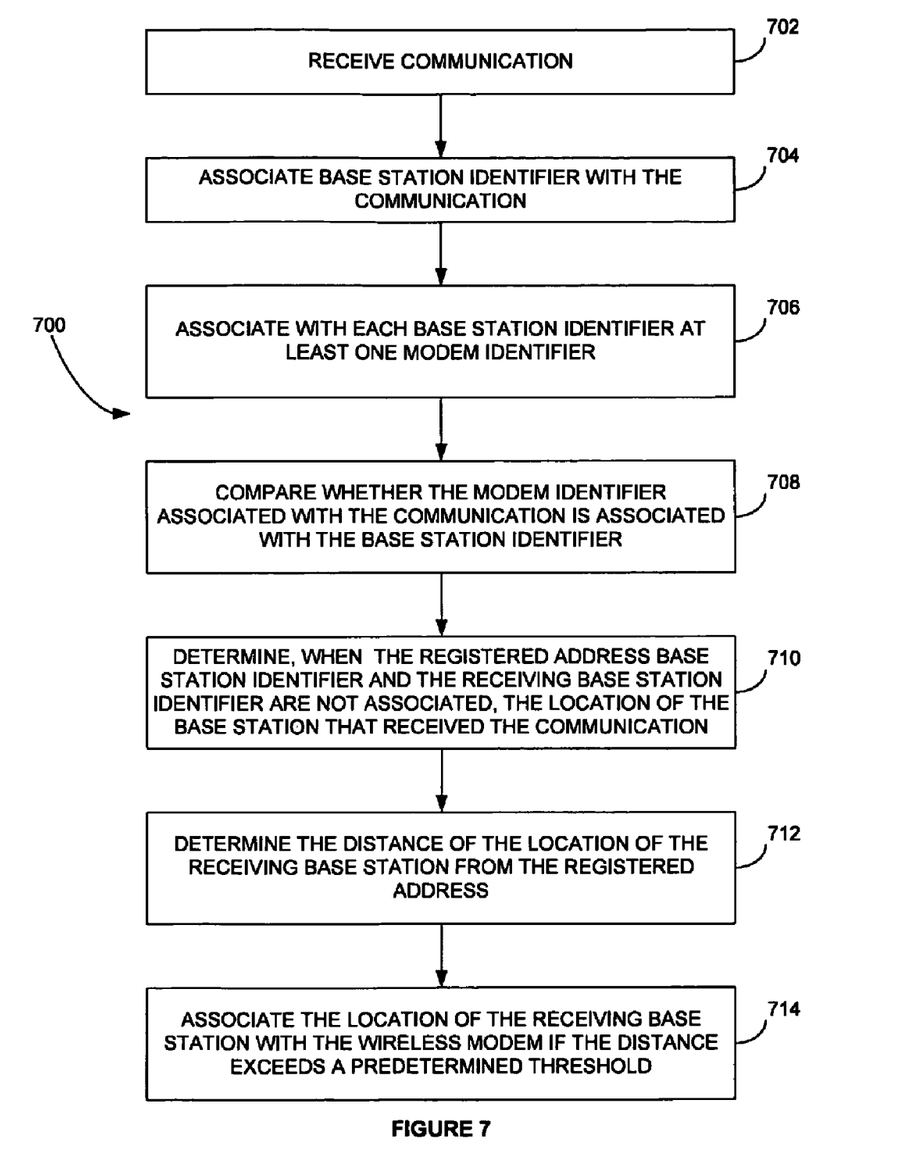
FIG. 7 is a flow diagram illustrating another embodiment of a method for associating an address with the location of a portable, wireless modem.

Referring to FIG. 7, an embodiment 700 of a method for associating a location with a wireless modem is disclosed. Embodiment 700 comprises receiving a communication at step 702 having an associated modem identifier and registered address. At step 704 the base station identifier serving the modem is associated with the communication. Subsequently, the proximity of the base station to the registered address is determined at steps 706 and 708. The determination at steps 706 and 708 is made by associating with the base station identifier associated with the call the identifiers of any modem being served by that base station. Thus, when a call is made that would be directed to a public sector service provider such as a PSAP or a private sector service subscriber, a comparison can be made of the serving base station identifier and modem identifiers associated with that base station on the basis of the modem's registered address. A comparison is then made at step 708 to determine whether the modem identifier associated with the communication is associated with the base station identifier.

If the comparison at step 708 indicates the registered address base station identifier and the serving base station identifier are associated in a database maintained by the telecommunications provider, then it can be presumed that the modem is most likely located at the registered address. If the identifiers differ, however, then embodiment 700 provides for determining the location of the serving or receiving base station at step 710. The distance of the location of the receiving base station from the registered address can then be determined using any number of well-known techniques in the art at step 712. If the distance determined in step 712 exceeds a predetermined threshold, then the location of the serving base station will be associated with the wireless modem. In such a circumstance, a PSAP serving the receiving base station will have the call routed to it for the appropriate response.

As with the method set forth in FIG. 5, the method of FIG. 7 provides an appropriate response to situations that may arise where the communication is not received by the base station associated with the registered address. In the method of FIG. 7, however, the modem identifier is checked to see if it is associated with the receiving base station identifier rather than vice versa. Once again, such situations can occur, by way of example only, where a modem lies on a boundary between one or more base stations such that any one of them may receive the call depending upon existing conditions, such as communications traffic. If the receiving base station is within the predetermined threshold distance from the registered address, a presumption may be followed that the modem is still located at the registered address and the PSAP for that registered address will receive the call. If the distance determined at step 712 is not within that predetermined threshold, then a presumption may be followed that the modem is not at the registered address and at least as an initial step the location of the receiving base station will be associated with the call. In this way, then, if the modem has been moved a far distance away from the registered address, a PSAP relatively close to the modem will receive the routed call rather than the PSAP associated with the registered address.

The embodiments disclosed herein can be readily implemented in a communication system as shown in FIG. 3. Such a system may comprise one or multiple processors, storage systems, and interfaces and be disposed in multiple locations, all as previously set forth.

Figure 8:
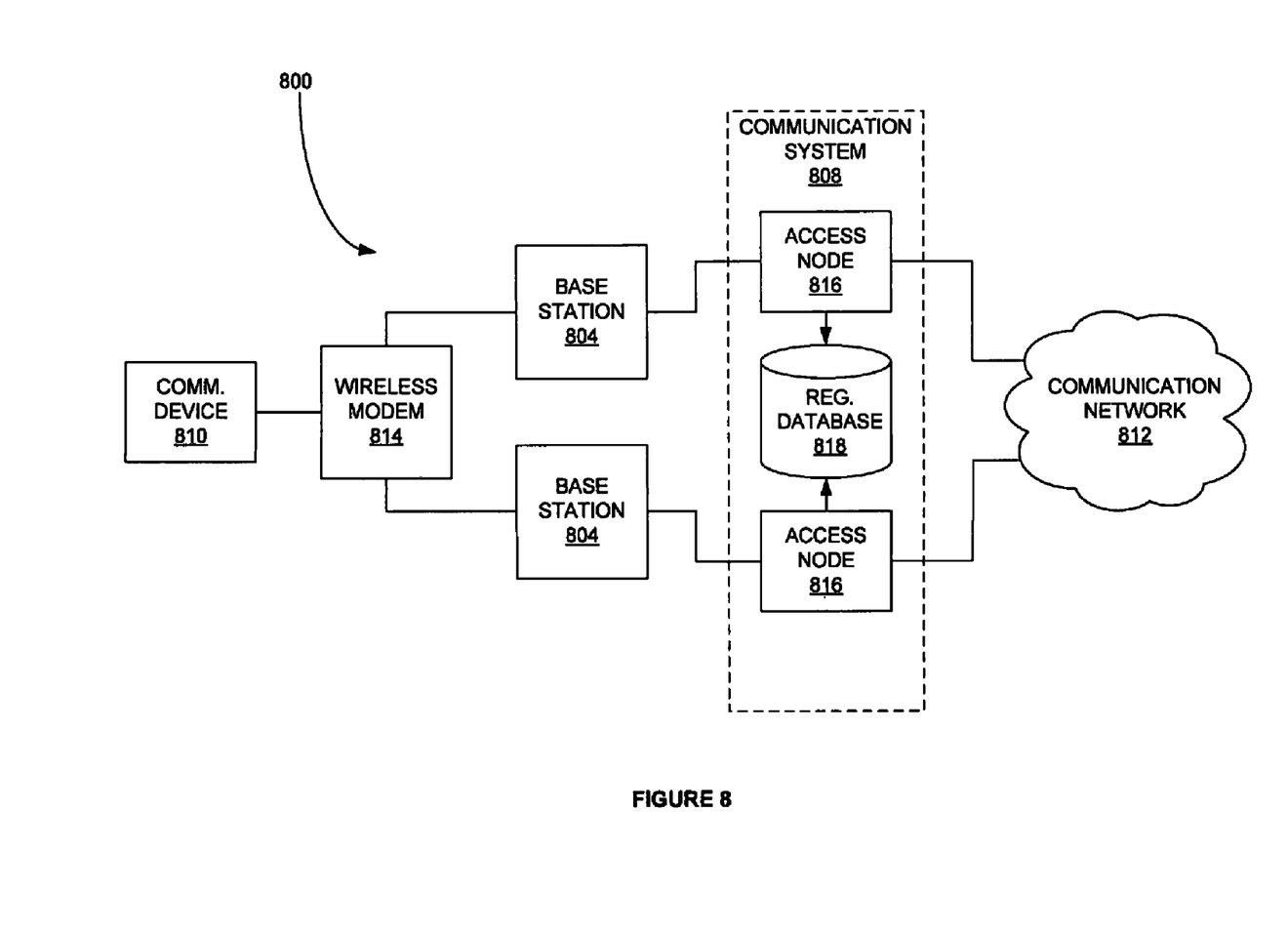
FIG. 8 is a block diagram illustrating a communications environment in which the embodiments disclosed herein may be used.

FIG. 8 illustrates a block diagram of communication environment 800 in which the various exemplary embodiments and their equivalents of the present invention can be employed. As shown in FIG. 8, such an environment 800 includes communication device 810, wireless modem 814, base transceiver stations 804, communication system 808, and communication network 812. Communication system 808 comprises multiple access nodes 816 and a registration database 818. Access node 816 is in communication with communication network 812. Each access node 816 is connected to registration database 818. Each base station 804 communicates with a different access node 816. Wireless modem 814 connects wirelessly to base station 804. Communication device 810 is in communication with wireless modem 814.

Communication device 810 is capable of transmitting and receiving voice data. Communication device 810 comprises hardware and circuitry programmed to function as a telecommunications device.

Communication device 810 is connected to wireless modem 814. The link between communication device 810 and wireless modem 814 may be either a wired or wireless connection. Wireless modem 814 comprises hardware and circuitry capable of providing wireless broadband access for communication device 810, such as a WiMAX modem.

Wireless modem 814 is in communication with one or more base stations 804 via a wireless connection. Base station 804 comprises hardware, circuitry, transceivers and other equipment capable of transmitting and receiving radio signals to provide wireless communication between wireless modem 814 and communication network 812.

Base station 804 is in communication with access node 816. In communication environment 800, each base station 804 is connected to a different access node 816. The connection between base station 804 and access node 816 may be either a wired or wireless connection.

Access node 816 is connected to communication network 812. The link between access node 816 and communication network 812 may be either a wired or wireless connection. Each access node 816 is connected to registration database 818. Registration database 818 stores a base station identifier, a modem identifier, or some other type of identifier.

Access node 816 facilitates communication between base station 804 and communication network 812. For example, access node 816 comprises an Access Service Network (ASN), an ASN Gateway, a Base Station Controller (BSC), a Mobile Switching Center (MSC), a transcoder, a Transcoder and Rate Adaptation Unit (TRAU), a Packet Control Unit (PCU), or any other system or equipment participating in the communication between base station 804 and communication network 812.

Communication network 812 is capable of providing a communication service to wireless modem 814 and communication device 810. For example, communication network 812 could comprise a packet-switched network, such as the Internet, a public switched telephone network (PSTN), an asynchronous transfer mode (ATM) network, a personal communication service (PCS) network, a local area network (LAN), a wide area network (WAN), a VoIP network, or any other network that provides a communication service to communication device 110 or communication system 108.

It will be understood, of course, that the foregoing communication environment 800 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner and location.

Figure 9:
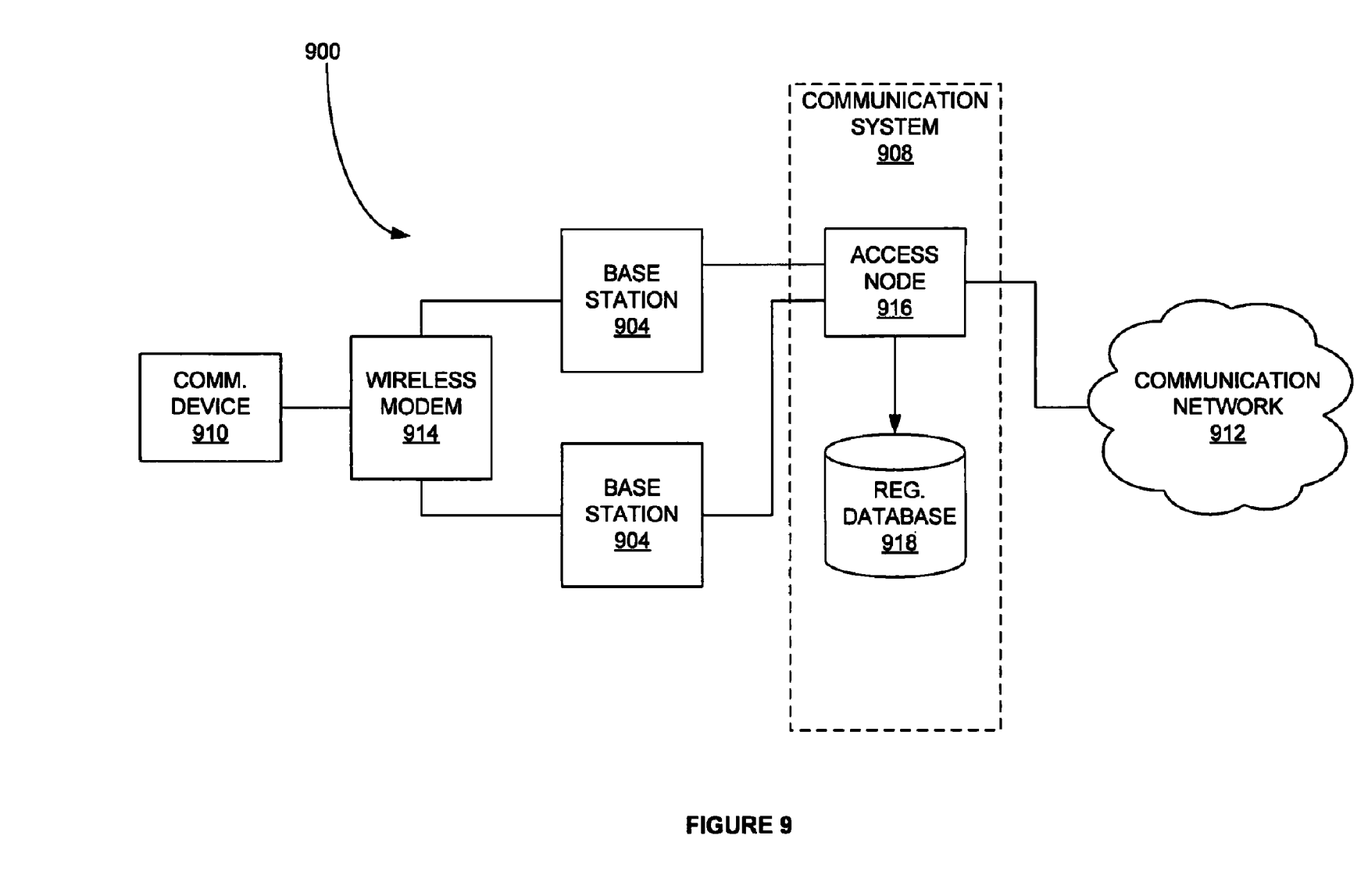
FIG. 9 is a block diagram illustrating a communications environment in which the embodiments disclosed herein may be used.

FIG. 9 illustrates a block diagram of communication environment 900 in which the various exemplary embodiments and their equivalents of the present invention can be employed. As shown in FIG. 9, such an environment 900 includes communication device 910, wireless modem 914, base transceiver stations 904, communication system 908, and communication network 912. Communication system 908 comprises access node 916 and registration database 918. Access node 916 is in communication with communication network 912. Access node 916 is connected to registration database 918. Each base station 904 communicates with access node 916. Wireless modem 914 connects wirelessly to base station 904. Communication device 910 is in communication with wireless modem 914.

Communication device 910 is capable of transmitting and receiving voice data. Communication device 910 comprises hardware and circuitry programmed to function as a telecommunications device.

Communication device 910 is connected to wireless modem 914. The link between communication device 910 and wireless modem 914 may be either a wired or wireless connection. Wireless modem 914 comprises hardware and circuitry capable of providing wireless broadband access for communication device 910, such as a WiMAX modem.

Wireless modem 914 is in communication with one or more base stations 904 via a wireless connection. Base station 904 comprises hardware, circuitry, transceivers and other equipment capable of transmitting and receiving radio signals to provide wireless communication between wireless modem 914 and communication network 912.

Base station 904 is in communication with access node 916. In communication environment 900, each base station 904 is connected to the same access node 916. The connection between base station 904 and access node 916 may be either a wired or wireless connection.

Access node 916 is connected to communication network 912. The link between access node 916 and communication network 912 may be either a wired or wireless connection. Each access node 916 is connected to registration database 918. Registration database 918 stores a base station identifier, a modem identifier, or some other type of identifier.

Access node 916 facilitates communication between base station 904 and communication network 912. For example, access node 916 comprises an Access Service Network (ASN), an ASN Gateway, a Base Station Controller (BSC), a Mobile Switching Center (MSC), a transcoder, a Transcoder and Rate Adaptation Unit (TRAU), a Packet Control Unit (PCU), or any other system or equipment participating in the communication between base station 904 and communication network 912.

Communication network 912 is capable of providing a communication service to wireless modem 914 and communication device 910. For example, communication network 912 could comprise a packet-switched network, such as the Internet, a public switched telephone network (PSTN), an asynchronous transfer mode (ATM) network, a personal communication service (PCS) network, a local area network (LAN), a wide area network (WAN), a VoIP network, or any other network that provides a communication service to communication device 910 or communication system 908.

It will be understood, of course, that the foregoing communication environment 900 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner and location.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a communication system, the method comprising:
   receiving a communication transmitted by a wireless modem wherein the modem has a modem identifier and a registered address associated therewith and wherein the communication includes the modem identifier;
   associating with the communication a receiving base station identifier of the base station that first received the communication;
   determining a location of the base station that first received the communication from the registered address;
   determining a distance of the location of the base station that first received the communication from the registered address; and
   associating the location of the base station that first received the communication with the wireless modem when the distance exceeds a predetermined threshold.

2. The method of claim 1 wherein said determining step comprises:
   associating with the registered address a registered address base station identifier based upon the location of the registered address; and
   comparing the registered address base station identifier with the receiving base station identifier.

3. The method of claim 2, and further comprising:
   determining, when the registered address base station identifier and the receiving base station identifier are not identical, the location of the base station that received the communication.

4. The method of claim 1, and further comprising:
   determining the location of the base station that received the communication.

5. The method of claim 1 and further comprising associating a first public safety answering point with the registered address.

6. The method of claim 5 wherein the communication is a 911 call, the method further comprising:
   routing the communication to the first public safety answering point if the wireless modem is located within a predetermined proximity of the registered address.

7. The method of claim 6, wherein if the said predetermined criteria is satisfied, said method further comprises:
   determining the location of the wireless modem; and
   routing the communication to the public safety answering point nearest to the location of the wireless modem.

8. The method of claim 5 wherein the call is a 911 call, the method further comprising:
   routing the communication to a public safety answering point based upon the location of the wireless modem.

9. The method of claim 8 and further including wherein the public safety answering point to which the communication is routed is the closest in proximity to the location of the wireless modem.

10. The method of claim 1 wherein the communication is directed to a subscriber of wireless modem location services and the subscriber makes deliveries.

11. The method of claim 1 and further comprising:
    associating with each base station identifier at least one modem identifier; and wherein said determining step comprises:
    comparing whether the modem identifier associated with the communication is associated with the receiving base station identifier.

12. The method of claim 11 wherein the location association step is performed when the modem identifier and the base station identifier are not identical.

13. A communications system for associating a location with a wireless modem, wherein the modem has a modem identifier and a registered address associated therewith, the system comprising:
    an interface configured to receive a communication; and
    a processing system including a storage system and software for directing operation of the processing system, the processing system configured:
    to receive the communication from the interface, wherein the communication includes the modem identifier,
    to determining a location of the base station that first received the communication from the registered address;
    determining a distance of the location of the base station that first received the communication from the registered address, and
    to associate the location of the base station that first received the communication with the wireless modem when the distance exceeds a predetermined threshold.

14. The communication system of claim 13 wherein the processing system is further configured:
    to associate with the registered address a registered address base station identifier based upon the location of the registered address; and
    to compare the registered address base station identifier with the receiving base station identifier.

15. The communication system of claim 14 wherein the processing system is further configured:
    to determine, when the registered address base station identifier and the receiving base station identifier are not identical.

16. The communication system of claim 13 wherein the processing system is further configured:
    to determine the location of the base station that received the communication.

17. The communication system of claim 13 wherein the processing system is further configured to associate a first public safety answering point with the registered address.

18. The communication system of claim 17 wherein the communication is a 911 call, and wherein the processing system is further configured:
    to route the communication to the first public safety answering point if the wireless modem is located within a predetermined proximity of the registered address.

19. The communication system of claim 18, wherein if the said predetermined criteria is satisfied, said processing system is further configured:
    to determine the location of the wireless modem; and
    to route the communication to the public safety answering point nearest to the location of the wireless modem.

20. The communication system of claim 17, wherein when said predetermined proximity is exceeded, said processing system is further configured:
    to route the communication to a public safety answering point based upon the location of the wireless modem.

21. The communication system of claim 18, wherein when said predetermined proximity is exceeded, said processing system is further configured:
    to route the communication to the public safety answering point that is the closest in proximity to the location of the wireless modem.

22. The communication system of claim 13 wherein the processing system is further configured:
    to associate with each base station identifier at least one modem identifier; and
    to compare whether the modem identifier associated with the communication is associated with the receiving base station identifier.

23. The communication system of claim 22 wherein the location association is performed when the modem identifier and the base station identifier are not identical.

24. The communication system of claim 13 wherein the communication is directed to a subscriber of wireless modem location services and wherein the processing system is further configured to route the communication to said subscriber.

\* \* \* \* \*